United States Patent [19]
Eckert

[11] 3,872,939
[45] Mar. 25, 1975

[54] MODULAR FINAL DRIVE FOR TRACK TYPE VEHICLES

[75] Inventor: Herbert L. Eckert, Cedar Rapids, Iowa

[73] Assignee: Harnischfeger Corporation, W. Milwaukee, Wis.

[22] Filed: Feb. 21, 1974

[21] Appl. No.: 444,310

[52] U.S. Cl................. 180/6.48, 74/606, 180/9.58, 180/9.62, 305/28
[51] Int. Cl....................... B62d 11/04, B62d 55/12
[58] Field of Search ......... 180/6.48, 6.7, 6.58, 9.62, 180/9.2 R; 305/28; 74/606 R

[56] References Cited
UNITED STATES PATENTS
| | | | |
|---|---|---|---|
| 3,631,615 | 1/1972 | Reinsma | 180/9.2 X |
| 3,773,128 | 11/1973 | Bowen | 180/6.48 |

*Primary Examiner*—David Schonberg
*Assistant Examiner*—John A. Pekar
*Attorney, Agent, or Firm*—James E. Nilles

[57] ABSTRACT

A modular final drive for each of a pair of endless tracks of a track type vehicle, which modular final drives are interchangeable with one another simply by adjusting the position of the transmission casing that is attached to the side of the drive sprocket housing. A fluid motor is provided for driving the gears of the transmission and which are located in the casing, and the fluid motor and its associated brake are located in an elevated and forward position relative to the sprocket housing so as to be protected from mud and other foreign objects with which the motor would otherwise become engaged. The sprocket housing is such that the sprocket is mounted between and is embraced by longitudinally extending side walls of the housing and in such a manner that the sprocket is straddle-mounted, that is to say, it is mounted on both of its sides for good load carrying and drive transmitting characteristics. The modular final drive is quickly and easily attached to the rear end of the track roller frame and in addition to bolt means for attaching the sprocket housing to the frame, there is provided a shear member connection for carrying the shear loads in all directions between the housing and frame.

20 Claims, 8 Drawing Figures

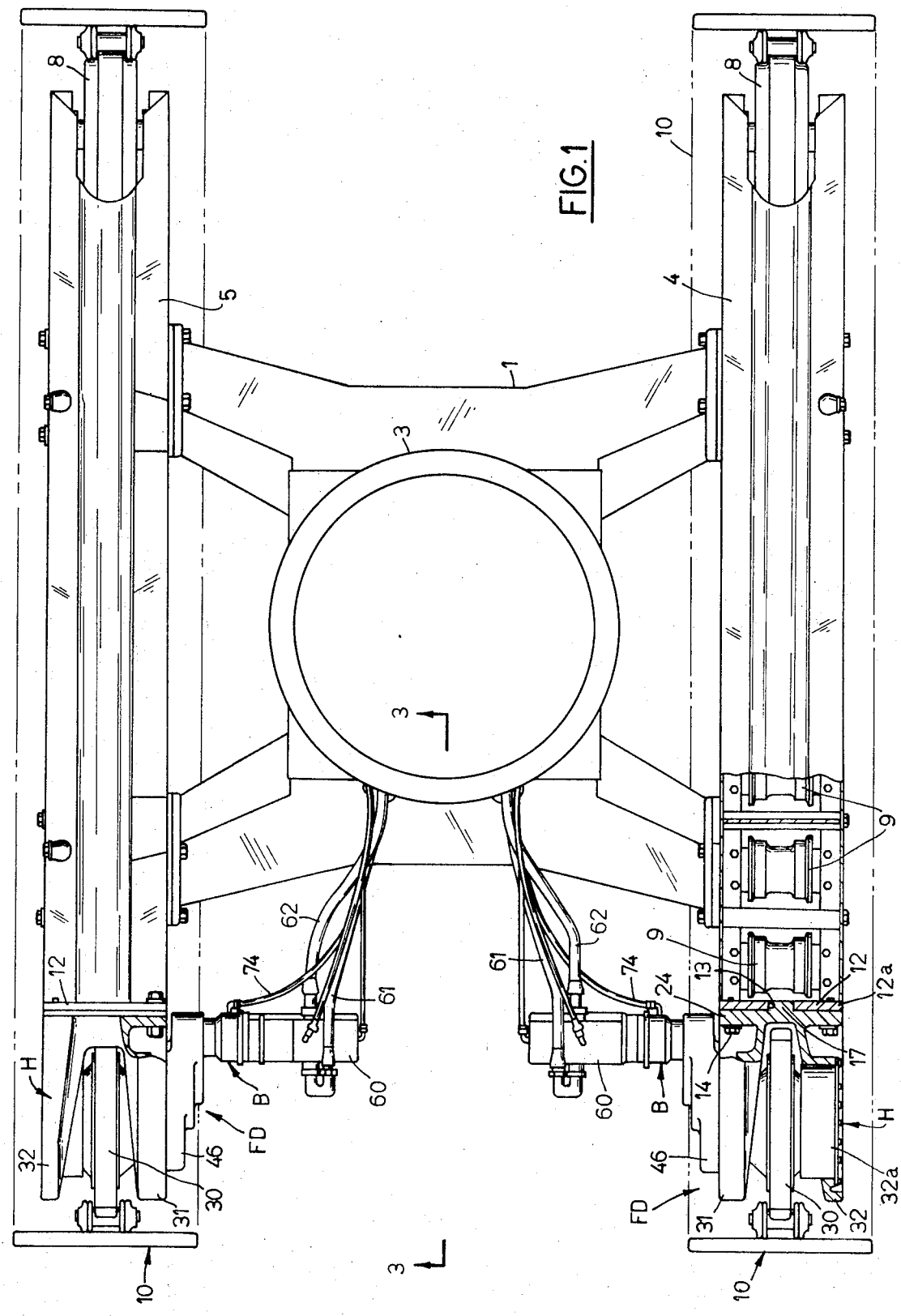

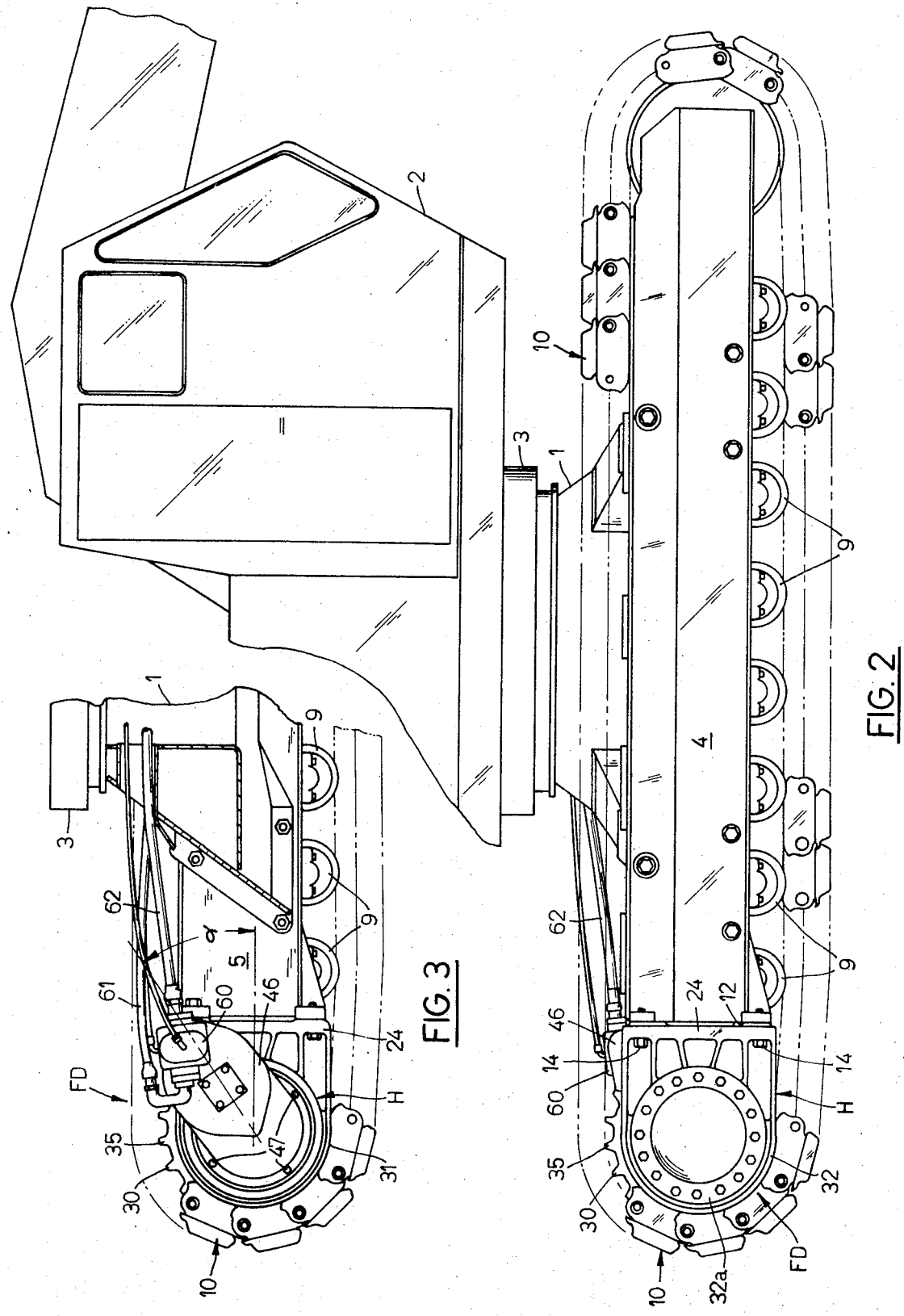

MODULAR FINAL DRIVE FOR TRACK TYPE VEHICLES

BACKGROUND OF THE INVENTION

Some prior art track type vehicles employed side mounting members for fastening the final drive unit to the track roller frame and this required many additional parts which were costly to manufacture and assemble and also resulted in difficulty in removing the final drive unit for repair, maintenance or inspection. Other prior art final drives for track type vehicles utilized a drive sprocket which was mounted in cantilever fashion on the outside of the sprocket housing and which did not provide maximum stability for the drive sprocket; furthermore, this prior art type of drive mounting utilized a fluid motor which was mounted rearwardly of the roller track frame and in a position to expose the motor to mud, rocks or other foreign objects while the vehicle was in operation; such a prior art drive is shown in the U.S. Pat. No. 3,773,128 issued Nov. 20, 1973 to Bowen et al. Furthermore, this latter type of prior art device utilized a speed reduction gear train which is mounted entirely in the sprocket housing and was therefore difficult to repair or replace without removing various components of the modular drive.

SUMMARY OF THE INVENTION

The present invention provides a modular final drive for each of the pair of endless tracks of a track type vehicle, and which final drives are interchangeable with one another simply by adjusting the gear casing relative to the sprocket housing, eliminating the necessity for stocking different types of parts and resulting in manufacturing and maintenance economies. The present invention also provides such a modular drive and in which a fluid motor and brake unit are connected to the gear casing and are located in an elevated and forward direction relative to the sprocket housing. More specifically, the fluid motor and brake assembly is located adjacent the rear end of the track roller frame and to the inside thereof and in an out-of-the-way protected position. Furthermore, the final drive of the present invention is compact and short in an axial direction because it does not have any track rollers associated therewith, and therefore can be closely coupled to the track frame.

Another aspect of the present invention relates to a drive of the above type which employs a shear member connection between the drive sprocket housing and the track frame, rather than a flush face-to-face relationship whereby the shear loads between the sprocket housing and track frame are absorbed in all directions and such shear loads are relieved from the fastening means between the housing and frame. In addition, the construction of the joint between the sprocket housing and track frame is such that any overhanging flanges are eliminated to minimize frame obstructions which would otherwise be subjected to damage from striking obstacles such as rocks, for example.

These and other objects and advantages of the present invention will appear hereinafter as this disclosure progresses, reference being had to the accompanying drawings.

BRIEF DESCRIPTION OF THE DRAWINGS

FIG. 1 is a plan view of the undercarriage of a vehicle embodying the present invention and showing a modular final drive attached to the rear end of each of the laterally spaced endless track frames, certain parts being shown as broken away, in section or removed for the sake of clarity in the drawings;

FIG. 2 is a side view of the vehicle shown in FIG. 1 and also showing a portion of the revolvable upper which is mounted on the undercarriage;

FIG. 3 is a portion of the undercarriage as shown in FIG. 2, but the view being shown in section and taken generally along the line 3—3 in FIG. 1;

DESCRIPTION OF A PREFERRED EMBODIMENT

Figure 5:
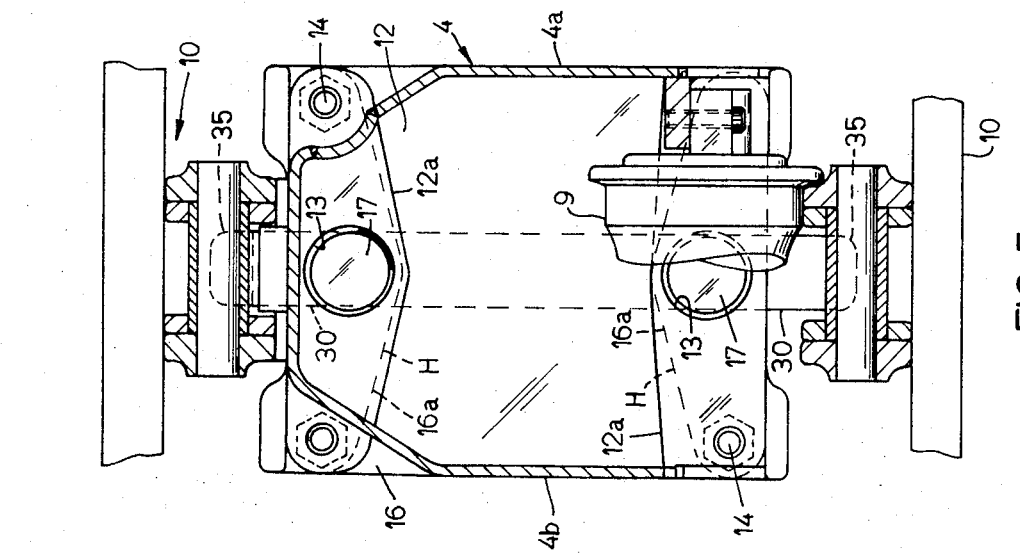
FIG. 5 is a transverse, elevational view, in section, taken generally along the line 5—5 in FIG. 4, with certain parts also shown as broken away or removed for the sake of clarity.

As shown in FIGS. 1 and 2, the undercarriage includes a main central frame 1 to which a revolvable upper 2 is rotatably attached by means of a conventional slewing ring 3 in the known manner. The undercarriage also includes a pair of laterally spaced elevated track roller frames 4 and 5 which are similar in construction and consequently a detailed description of only one of them will be referred to. These track roller frames as shown in FIG. 5 are generally of inverted U-shape in cross section and fabricated from heavy steel and extend longitudinally of the vehicle. At the front end of these frames is mounted an idler sprocket 8 and a series of track rollers 9 are also rotatably mounted in a longitudinally spaced relationship along the frame 4 and support the endless, articulated track 10, in the known manner. The rear end of the track frames is comprised of a transverse plate or wall 12 having round apertures 13 therein, and to which wall a modular final drive FD is attached by the removable bolt means 14 and shear member connections to be described.

The modular final drive includes a housing H which has a shear member means connection with the frame 4. This means is shown as shear members 17 which extend from the wall 16 and having a close fit interengagement in aperture 13 of wall 12. More specifically, surfaces 16a of wall 16 abut against the surfaces 12a of plate wall 12 and are rigidly held thereagainst by the bolt means 14. The shear member connection formed by members 17 and apertures 13 acts to absorb the shear load which is imposed on the modular drive. The shear means may take the form of different numbers of members 17, taking the shear forces from the bolts 14, thereby greatly strengthening the joint between the housing and the frame and eliminating wear and looseness of the bolt means.

It will be noticed, particularly from FIG. 5, that the side walls 4a and 4b of the track frame 4 are flush all the way to the rear end of the track frame 4 and there is no flange at the rear end of the track frame 4. Instead, as previously mentioned, the track frame 4 terminates in a wall 12 within the frame. In this manner, no outwardly extending obstruction such as in the form of a flange is presented between the track frame and the sprocket housing which would otherwise be subjected to damage from striking obstacles, such as rocks, while the vehicle is in operation.

A drive sprocket 30 is mounted entirely between the inner side wall 31 and an outer side wall 32 of the housing H. Sidewall 32 includes a removable plate portion 32a having a hub 33.

Suitable antifriction bearing assemblies 34 journal the drive sprocket in the side walls 31 and 32 of the housing H, thereby rotatably supporting the drive sprocket on both of its sides; in other words, straddle-mounting the drive sprocket in the housing. The drive sprocket has large lugs 35 around its periphery for engagement with the endless track 10 in the known manner and this drive sprocket furthermore has an internal ring gear 36 formed therein which is in constant mesh with planetary gears 37 (one shown) that in turn are journalled by anti-friction bearing means 38 on stub shaft 39. The stationary stub shaft 39 in turn is rigidly mounted in ring 43 and receives its driving power from a sun gear 40 that is splined to a drive shaft 41. Ring 43 is splined to the hub portion 33 of side wall 32 and is thus stationary.

The drive shaft 41 in turn extends laterally outside of the housing and its free end 41a has a large gear 42 splined thereto. The drive shaft 41 is journalled in anti-friction bearing means 44 which in turn are mounted in a side casing 46. The side casing 46 is detachably connected by bolt means 47 to the side wall 31 of the housing H. It will be noted that the side casing 46 extends forwardly and upwardly and its front end 46a terminates forwardly of the juncture between the housing H and the track roller frame 4.

The side casing 46 also has an idler stub shaft 52 journalled therein by anti-friction bearing means 53, 54 and a gear 56 is splined to shaft 52 and is in constant mesh with a smaller gear 58 which is rotatably journalled by anti-friction bearing means 59 in the forward end of the side casing 46.

Thus, a speed reduction gear train is mounted in the side casing 46 and comprises a shaft 41, gear 42, shaft 52, gear 56, and gear 58. Shaft 41 also extends into the housing H and the gear train is completed by the small central sun gear 40 fixed to shaft 41, planet gears 37 freely rotatably on fixed shafts 39, and internal ring gear 36 formed with the sprocket 30, all located within the housing H.

Power is provided to the gear train by the conventional hydraulic motor 60 which receives its pressure fluid via conduits 61 and 62 and from a fluid pressure pump (not shown) located on the vehicle. The pump shaft 64 drives a shaft 66, the end of shaft 66 being connected by its splines to the interior splined portion 57 of gear 58. A conventional brake B of the interleaved friction plate type is interposed between the brake housing 70 and the shaft 66 and this brake is hydraulically actuated by fluid pressure from the conduit 74 which in turn also receives its fluid pressure from the fluid pump (not shown). It will be noted that the fluid motor 60 and the brake B are conventional in character and are located adjacent the rear end of the track frames and in a well elevated position (FIG. 4) so as to be protected from mud, rocks or other foreign objects while the vehicle is in operation.

It will also be noted that the sprocket housing H has no track rollers associated therewith, but rather the rollers 9 are mounted on the track frame 4. Consequently, the sprocket housing H is of a design and this compact housing has relatively little overhang or cantilever effect relative to the track frame and this also results in the ability to position the hydraulic motor in the aforesaid, forward protected position.

Figure 4:
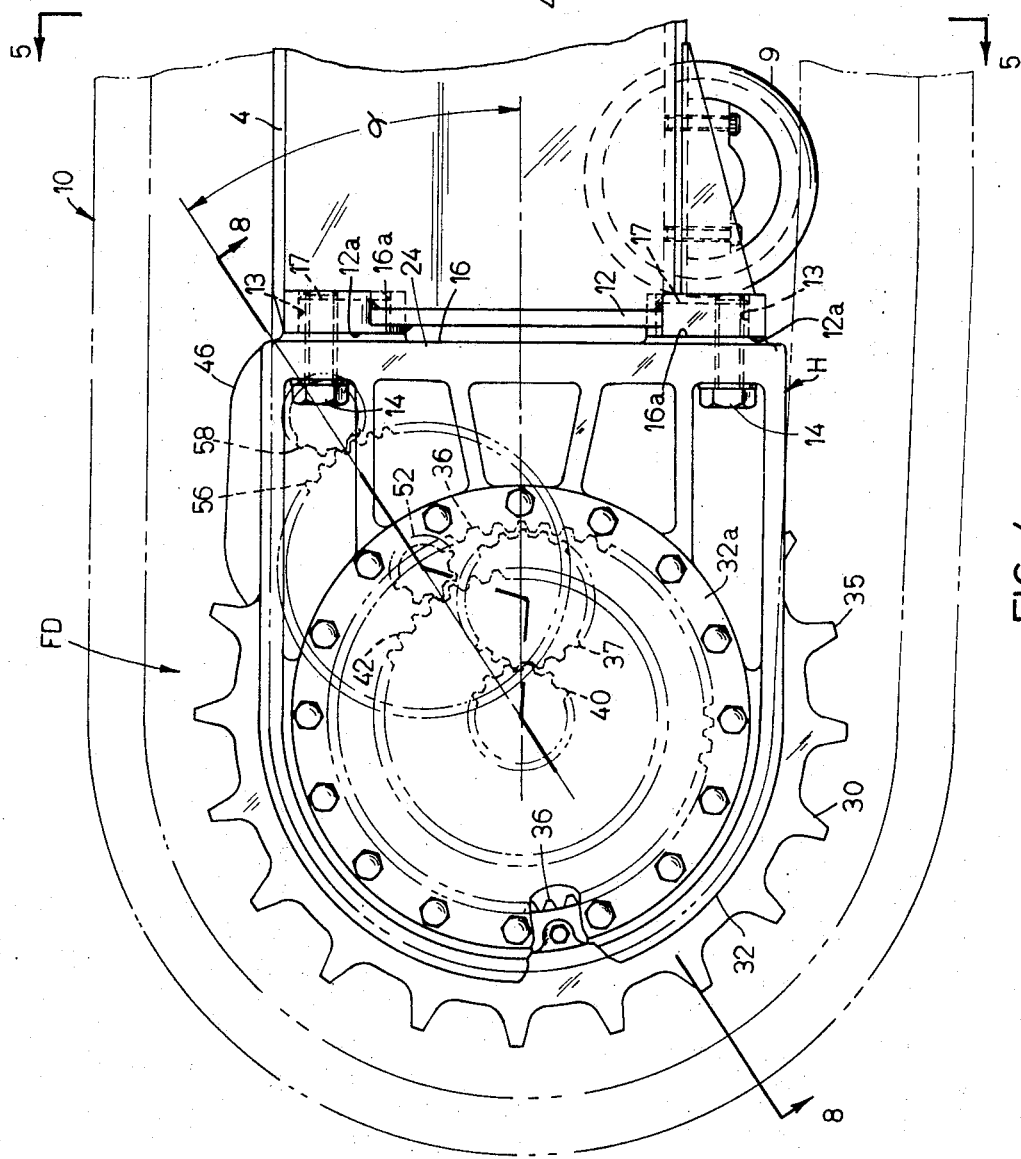
FIG. 4 is a side elevational view of a portion of the undercarriage as shown in FIG. 2, but on an enlarged scale and with certain portions broken away or removed for the sake of clarity.
Figure 7:
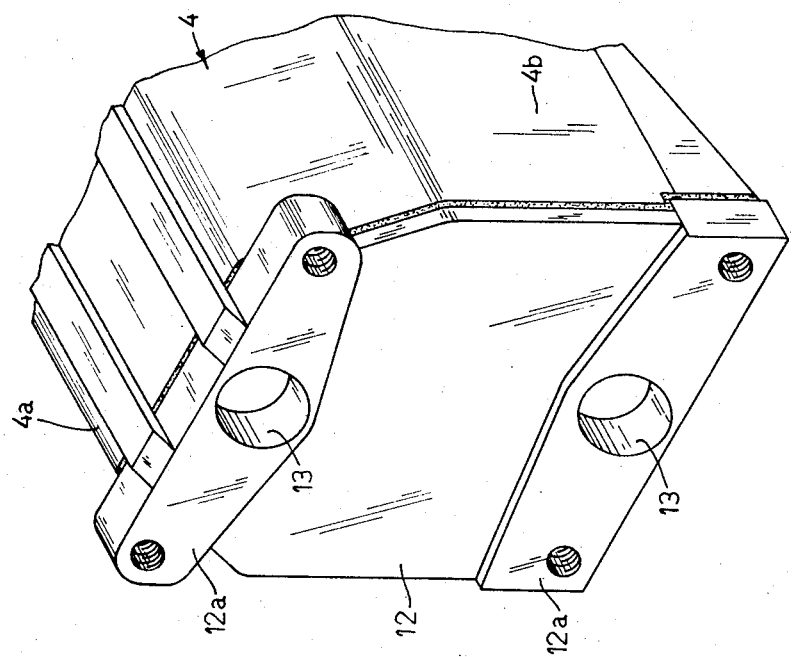
FIG. 7 is a fragmentary perspective view of the rear end of the track roller frame.
Figure 6:
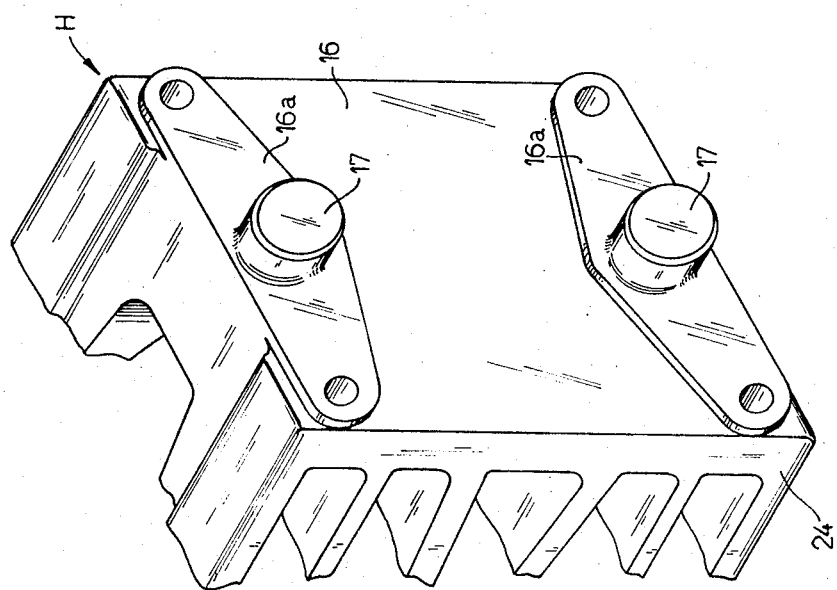
FIG. 6 is a fragmentary perspective view of the front end of the sprocket housing.
Figure 8:
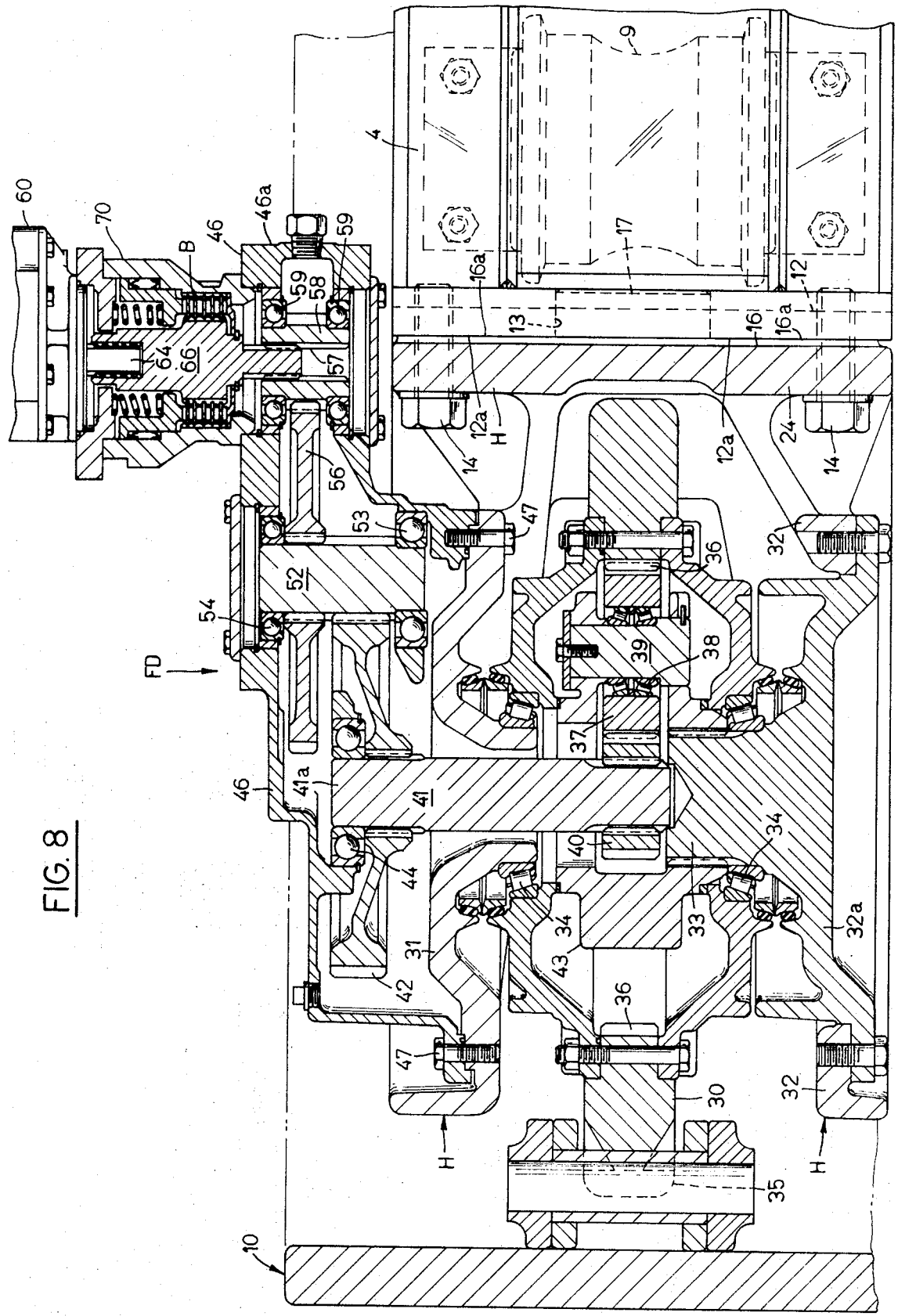
FIG. 8 is a sectional view taken generally along the line 8—8 in FIG. 4, but on an enlarged scale, and showing the modular final drive as provided by the present invention.

The modular final drives are interchangeable, that is from the left to the right side of the vehicle. In the illustration shown by way of example, this is accomplished simply by removing bolts 47 which attach the auxiliary side casing to the housing H and swinging the side casing approximately 74°, and then refastening the bolts 47. The spacing of bolts 47 is such as to permit this repositioning. Also, the angle α as shown in FIGS. 3 and 4, is about 37° to permit this reversal, in the illustration shown. The angle α is measured between a horizontal line and a line extending from the center of the sprocket 30 and the center of gear 58. This permits the housing and its associated casing simply to be turned over 180° so as to be mounted on either side of the vehicle. For other forms of the invention, the above angles may vary from those shown and described.

Thus, the present invention provides a modular final drive for a track lying vehicle and which drive can be interchangeable from right to left sides. The drives are furthermore axially short and compact and are mounted to the track frame with relatively little cantilever effect. This also permits the fluid motor to be located in a forward and elevated position relative to the housing. The drive sprocket is mounted entirely within the housing and is straddle-mounted by the sprocket being supported on each of its sides within the housing. The considerable shear forces between the sprocket housing and the track roller frame are absorbed by the shear means connection, thus relieving the shear from the bolts 14.

I claim:

1. A modular final drive in combination with a track type vehicle having a pair of track roller frames, one disposed longitudinally along each side of the vehicle and each frame having a rear end; said final drive comprising, a housing, a track driving sprocket rotatably mounted in the housing, means for rotatably supporting said sprocket on each of its sides and in the housing, fastening means for detachably securing said housing to said rear end of said track roller frame, a gear train mounted on the side of said housing and extending forwardly and upwardly therefrom and terminating in a forward elevated end which is adjacent the juncture between the housing and rear end of said track frame, motor means located at an elevated and forward position relative to the housing and connected with said forward elevated end of said gear train, and means for detachably and adjustably positioning the gear train relative to the housing so as to render said modular drive usable with either of said track frame.

2. The drive as set forth in claim 1 further characterized in that said roller track frames have side walls which extend rearwardly and are flush with said housing to thereby form a smooth joint between said frame and said housing.

3. The drive as set forth in claim 1 further characterized in that said gear train extends generally upwardly and forwardly from said sprocket at an angle of about 37° from the horizontal.

4. The final drive as set forth in claim 3 including an interengaging shear member connection between said housing and said rear end of said roller frame to absorb the shear forces therebetween.

5. The final drive as set forth in claim 4 further characterized in that said housing has two laterally spaced side walls and in which said means for rotatably supporting said sprocket are mounted.

6. The final drive as set forth in claim 1 further characterized in that said housing has a forward transverse surface from which a shear member extends forwardly, and said rear end of said roller frame terminates in a transverse wall having a round aperture therein for the snug reception of said shear member when said surface is in said abutting relationship with said wall to thereby form an interengaging connection for absorbing shear between the roller frame and the sprocket housing.

7. The final drive as set forth in claim 1 including an interengaging shear member connection between said housing and said rear end of said roller frame to absorb the shear forces therebetween.

8. The final drive as set forth in claim 1 further characterized in that said housing has two laterally spaced side walls and in which said means for rotatably supporting said sprocket are mounted.

9. The final drive as set forth in claim 8 further characterized in that one of said side walls includes a removable plate portion having a central hub extending inwardly therefrom, said hub supporting a portion of said gear train which is mounted in said sprocket.

10. A track type vehicle having a pair of laterally spaced track roller frames, one frame disposed longitudinally along each side of the vehicle and each frame having a rear end; a modular final drive for being mounted on each of said frame rear ends, said drives also being interchangable on either of said frames, each of said final drives comprising; a housing, a track driving sprocket mounted within the housing, means for rotatably supporting said sprocket on each of its sides within the housing, fastening means for detachably securing said housing to said rear end of said track roller frame, casing means detachably and adjustably mounted on the side of said housing and extending forwardly and upwardly therefrom and terminating in a forward elevated end which is adjacent the juncture between the housing and rear end of said track frame, a gear train within said casing and removable with the casing means from said housing, attaching means for positioning the casing means and its gear train relative to the housing so as to render said modular drive usable with either of said track frame, and motor means connected with said forward and elevated end of said gear train whereby said motor is located at an elevated and forward position relative to the housing.

11. The vehicle as set forth in claim 10 further characterized in that said gear train extends generally upwardly and forwardly from said sprocket at an angle of about 37 degrees from the horizontal.

12. The vehicle as set forth in claim 10 including an interengaging shear member connection between said housing and said rear end of said roller frame to absorb the shear forces therebetween.

13. The vehicle as set forth in claim 10 further characterized in that said housing has two laterally spaced side walls and in which said means for rotatably supporting said sprocket are mounted.

14. The vehicle as set forth in claim 13 further characterized in that one of said side walls includes a removable plate portion having a central hub extending inwardly therefrom said hub supporting a portion of said gear train which is mounted in said sprocket.

15. A modular final drive for a track type vehicle of the type having a pair of track roller frames, one frame being arranged along each side of the vehicle and each frame having a rear end; said final drive comprising; a housing, a track driving sprocket rotatably mounted within the housing, anti-friction bearing means for rotatably supporting said sprocket on each of its opposite sides and within the housing, fastening means for detachably securing said housing to said rear end of said track roller frame, a gear train mounted on the side of said housing and extending forwardly and upwardly therefrom and terminating in a forward elevated end, motor means connected with said forward and elevated end of said gear train, and casing means enclosing said gear train and having fastening means for detachably and swingably positioning the gear train relative to the housing whereby said modular drive is interchangable with either track roller frame.

16. The drive as set forth in claim 15 further characterized in that said gear train extends generally upwardly and forwardly from said sprocket at an angle of about 37 degrees from the horizontal.

17. The final drive as set forth in claim 15 further characterized in that said housing has a forward transverse surface from which a shear member extends forwardly, and said rear end of said roller frame terminates in a transverse wall having a round aperture therein for the snug reception of said shear member when said surface is in said abutting relationship with said wall to thereby form an interengaging connection for absorbing shear between the roller frame and the sprocket housing.

18. The final drive as set forth in claim 15 including an interengaging shear member connection between said housing and said rear end of said roller frame to absorb the shear forces therebetween.

19. The final drive as set forth in claim 15 further characterized in that said housing has two laterally spaced side walls and in which said means for rotatably supporting said sprocket are mounted.

20. The final drive as set forth in claim 19 further characterized in that one of said side walls includes a removable plate portion having a central hub extending therefrom, said hub supporting a portion of said gear train which is mounted in said sprocket.

* * * * *